Nov. 20, 1956  F. A. CHASE ET AL  2,771,364
CARBONATION OF COFFEE EXTRACT
Filed June 11, 1954
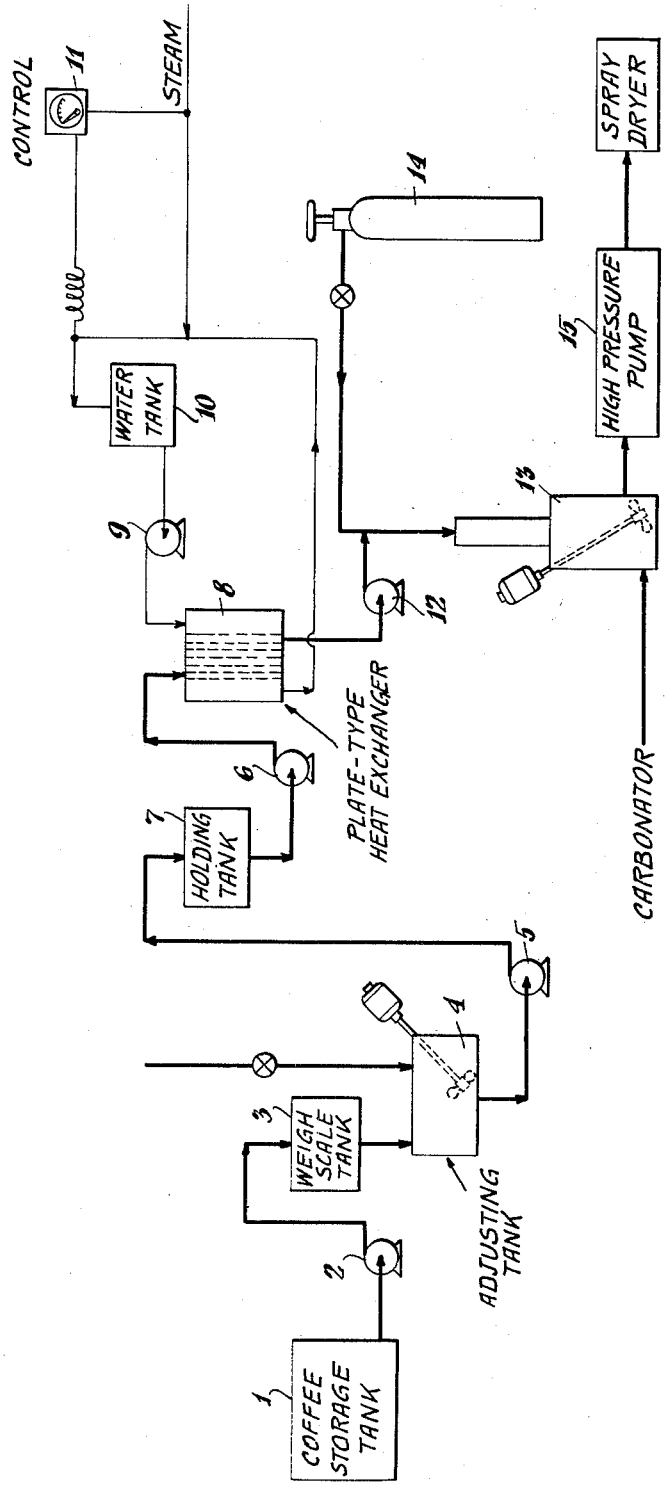
INVENTORS
Fletcher A. Chase
BY George E. Laursen
Marston L. Hamlin
ATTORNEY United States Patent Office 2,771,364
Patented Nov. 20, 1956

2,771,364

CARBONATION OF COFFEE EXTRACT

Fletcher A. Chase, Morris Plains, and George E. Laursen, West Orange, N. J., assignors to American Home Products Corporation, New York, N. Y., a corporation of Delaware Application June 11, 1954, Serial No. 436,124

2 Claims. (Cl. 99—71)

This invention relates to a method of carbonation of coffee extract and to the resulting product.

In the production of so-called "instant coffee" it is essential that the solid soluble coffee extract constituting such a product be produced in a free flowing, quickly soluble form. Commercial considerations also make it desirable that the product have a relatively high apparent specific volume. We have discovered a method by which this may be achieved and by which other advantages are secured as described below.

In the production of instant coffee, a highly concentrated aqueous coffee extract is ordinarily spray dried. The properties of the spray-dried residue tend to vary substantially, depending on the method of extraction, type of coffee extracted and other variables. These variations in properties of the dried material are thought to be largely due to differences in the content of pectinous materials in the liquid extract, but we do not rely on this explanation as established beyond doubt. Whatever the causes, we have found that these variations in the properties of the dried product are largely equalized and, surprisingly, the capacity of the spray-drying equipment is substantially increased by the use of our process.

According to our process we saturate a concentrated coffee liquor, produced by percolation, with carbon dioxide under superatmospheric pressure at an elevated temperature below the boiling point of the liquor, and then pass the carbonated liquor through a spray-drier. The resulting product is in the form of sphere-like particles which retain some carbon dioxide in adsorbed or occluded form. They are free-flowing and voluminous; the retained carbon dioxide appears to have a beneficial effect on keeping quality and flavor and its release during preparation of beverage coffee by the addition of hot water appears to speed up solution.

In our process we prefer to use a liquor containing about 40–52% dissolved coffee solids, although concentrations up to 58% may be used. Such liquors are prepared by percolation of hot water through ground roasted coffee. Best results are obtained by using a series of percolators containing, in the direction of water flow, progressively less extracted coffee. In such a system, the water enters the train at a high temperature, say about 125°–150° C., passes through it with a generally descending temperature gradient, and leaves at a low temperature, say about 15°–25° C., after contact in the last percolator with fresh or little extracted coffee. We may, however, operate with a somewhat higher temperature at the exit end of the train for the purposes of this process, e. g. at about 45–50° C.

We spray the liquor, preheating if necessary, at a temperature preferably of about 50° C., but in the range of about 40°–65° C., into a pressure carbonator charged with carbon dioxide at a pressure preferably of about 60 lb. per sq. in. gage (p. s. i. g.); but the advantages of this invention may be realized to some extent at other pressures, e. g. about 15–150 lb. p. s. i. g. We prefer to operate this carbonation step continuously, passing the liquor through the carbonator as a continuous stream and supplying carbon dioxide at a sufficient rate to maintain the chosen saturation pressure.

From the carbonator, the liquor passes to a high-pressure pump which feeds it to a conventional spray drier. Our preferred conditions for operating the spray drier are: a liquor inlet pressure of 800–1000 lb. p. s. i. g., an air inlet temperature of about 260° C. and an outlet air temperatuer of about 110° C. The rate of air feed will depend on the size of the drier and the rate of liquor feed, but may advantageously be 7000 cu. ft. per minute for 1000 lb. of liquor/hour containing 50% soluble solids in a chamber of 3900 cu. ft. volume. These preferred conditions are subject to considerable variation, as is well known in the art.

The accompanying drawing and following description illustrate one embodiment of our invention, but are intended to be exemplary only and not to limit our invention, the scope of which is defined in the appended claims.

*Example*

The single figure of the drawing is a diagrammatic flow sheet of our process. The spray drier may be of any conventional type. The main apparatus units are designated by legends.

Concentrated coffee liquor is pumped from storage tank 1 by pump 2 to a continuous weighing tank 3 and thence to an adjusting tank 4 provided with an agitator, where its concentration of dissolved coffee solids is adjusted to a standard concentration, e. g. 45%. This may be done by adding more or less concentrated coffee extract or water, as required. The adjusted liquor is then pumped by pumps 5 and 6 through holding tank 7 to a heat exchanger 8, which may be of the plate type. In the latter the extract is heated to a temperature of 50° C. by being brought into indirect heat-exchange relation with hot water. The water is advantageously circulated by pump 9 from and to water tank 10 and is heated by free steam, the flow of which is thermostatically controlled to provide the necessary temperature by a conventional control device 11.

The liquor at 50° C. is pumped from the heat exchanger 8 by pump 12 into carbonator 13 at a pressure of 60 lb. p. s. i. g. The carbonator is of conventional type, such, for example, as supplied by the Liquid Carbonic Corporation. The carbonator is provided with an agitator and the liquor is sprayed into the carbon dioxide atmosphere maintained in it at approximately 60 lb. p. s. i. g. by controlled introduction of the gas from a pressure source 14. The liquor is agitated in the carbonator in contact with the carbon dioxide atmosphere for a period of 5–8 minutes, thereby becoming saturated with the gas.

From the carbonator the saturated liquor is pumped by a high-pressure pump 15 to a conventional spray dryer of the box type.

The liquid feed pressure is 800–1000 lb. p. s. i. g., the air inlet temperature is about 260° C. and the outlet temperature about 110° C. For a feed of liquor of 2 gal. per minute with 50% soluble solids content, we use an air flow 7000 cu. ft. per minute.

We find that a spray-drying unit that, without our novel carbonation step, has a capacity of 450 lbs. solid coffee extract per hour containing 1.2% moisture, by the use of our process produces as much as 525 lbs. solid coffee extract per hour containing 1.2% moisture. Our process in addition to yielding a more desirable product, thus substantially reduces the plant investment required for a given output, since the cost of the additional carbonation equipment is considerably less than the cost of adding spray-drying capacity.

The several units of equipment used in our process being of well known types and forming no part of our invention, more detailed description is believed unnecessary.

The product produced according to our method consists of sphere-like particles having, when packed for commercial distribution, a specific apparent volume of 4.5–7.0 cc./g. with carbonation as compared with 2.2–3.5 cc./g. for a product produced conventionally. It is free flowing and rapidly soluble. The adsorbed or occluded carbon dioxide appears to contribute to the maintenance of excellent quality during shelf life and to increase the speed of solution in hot water.

From the above disclosure it will be evident to those skilled in the art that various changes can be made in the interrelated conditions of operation without departing from the spirit of our invention.

We claim:

1. In a process of producing soluble solid coffee extract in which a highly concentrated aqueous coffee extract containing up to 58 percent soluble coffee solids is spray dried, the improvement which comprises absorbing carbon dioxide to saturation in said aqueous extract by intimately contacting said extract with an atmosphere of carbon dioxide at an elevated temperature below the boiling point of the extract and at superatmospheric pressure in the range 15–150 lb. p. s. i. g., and then feeding the extract at a much higher pressure to a spray drier.

2. A process of producing a particulate free-flowing voluminous soluble solid coffee extract which comprises: providing an aqueous coffee extract having a content of 40 to 58 percent dissolved coffee solids, intimately contacting the extract at a temperature in the range 40°–65° C. with gaseous carbon dioxide at a pressure in the range 15–150 lb. p. s. i. g., maintaining contact of liquid and gas for a sufficient time to substantially saturate the liquid with the gas, and spray-drying the saturated liquid at a liquid inlet pressure much higher than that obtaining during the carbonation.

References Cited in the file of this patent

UNITED STATES PATENTS

| | | |
|---|---|---|
| 1,393,045 | Scott | Oct. 11, 1921 |
| 1,406,381 | Heath et al. | Feb. 14, 1922 |

FOREIGN PATENTS

| | | |
|---|---|---|
| 620,383 | Great Britain | Mar. 23, 1949 |